United States Patent [19]

Zahid

[11] 4,347,871

[45] Sep. 7, 1982

[54] PRESSURE ACCUMULATOR WITH LOCKING NUT

[75] Inventor: Abduz Zahid, Los Angeles, Calif.

[73] Assignee: Greer Hydraulics, Inc., Chatsworth, Calif.

[21] Appl. No.: 902,972

[22] Filed: May 4, 1978

[51] Int. Cl.[3] .............................. F16L 55/04

[52] U.S. Cl. .............................. 138/30; 411/353; 411/512; 411/517

[58] Field of Search .............................. 138/30; 220/85 B; 285/208; 85/8.8

[56] References Cited

U.S. PATENT DOCUMENTS

| | | | |
|---|---|---|---|
| 2,390,320 | 12/1945 | Overbeke | 138/30 |
| 2,401,791 | 6/1946 | Overbeke | 138/30 |
| 2,630,834 | 3/1953 | Weber et al. | 138/30 |
| 2,877,801 | 3/1959 | Mercier | 138/30 |
| 2,936,787 | 5/1960 | Mercier | 138/30 |
| 3,038,501 | 6/1962 | Greer | 138/30 |
| 3,148,705 | 9/1964 | Mercier | 138/30 |
| 3,439,712 | 4/1969 | Mercier | 138/30 |
| 3,687,165 | 8/1972 | Mercier | 138/30 |
| 4,056,127 | 11/1977 | Greer | 138/30 |

FOREIGN PATENT DOCUMENTS

| | | | |
|---|---|---|---|
| 710746 | 6/1954 | United Kingdom | 138/30 |

*Primary Examiner*—James E. Bryant, III
*Attorney, Agent, or Firm*—Arthur B. Colvin

[57] ABSTRACT

An accumulator incorporating an improved plug retaining assembly for supporting the plug and associated valve asssembly in the oil port of an accumulator device. More particularly, there is provided in accordance with the invention a split locking ring assembly adapted to be deformed in such manner that the same may be readily convoluted about the shoulder portion of a plug assembly, enabling the use of an improved oil port sealing arrangement.

2 Claims, 3 Drawing Figures

PRESSURE ACCUMULATOR WITH LOCKING NUT

BACKGROUND OF THE INVENTION

1. Field of the Invention

The present invention is in the field of accumulator devices and pertains more particularly to an accumulator device having a novel plug and locking assembly which may be readily positioned in the oil port of the accumulator to define an effective seal.

2. The Prior Art

As conducive to an understanding of the present invention, it is to be noted that pressure accumulators conventionally employ a plug assembly which may include a valve, the assembly being mounted in the oil port of a pressure vessel. From time to time it becomes necessary to remove and replace the plug assembly. If an attempt is made with conventional accumulator devices to release the mechanism which retains the plug assembly in position before all of the pressure has been relieved from the interior of the accumulator, the plug may suddenly blow out of the oil port, causing severe injury to the operator.

In U.S. Pat. No. 2,936,787 there is disclosed an accumulator mechanism employing a locking ring which prevents such blow outs. Briefly, the accumulator of the noted reference includes a plug having a retaining flange of smaller outside diameter than the oil port whereby the plug may be inserted into the interior of the pressure vessel. The locking ring is comprised of a series of arcuate metal segments which together form an annulus. The outside diameter of the segments is greater than the diameter of the oil port and the inside diameter of the segments is smaller than the diameter of the flange of the plug.

The segments are held together by a surrounding continuous elastomeric resilient ring, enabling the segments to be deformed from a coplanar alignment by folding the ring and, thus folded, to be passed into the interior of the pressure vessel through the oil port. Thereafter the shank of the plug is drawn outwardly through the aperture defined by the segments until the under surface of the flange seats against the upper surface of the segments, whereby the plug may not be removed or blown out through the oil port even after the clamping nut typically employed to maintain the plug in position has been removed by an operator.

With the prior art assembly described, after emplacement of the plug and locking ring, it has been necessary to force a seal member upwardly into the annular space defined between the oil port and the external diameter of the plug. Obviously, since the seal provides the major resistance to leakage of oil under pressure, tight and effective interfit between the annular seal and the opposed faces of the oil port and plug must be secured. However, since the sealing ring which is to provide the seal must perforce engage intimately both of the noted surfaces, positioning thereof is a tedious job and often requires the use of tools, which must be pushed against the under surface of the ring to advance the same upwardly to the desired location within the oil port. If the ring or the adjacent faces of the plug or oil port are scarred in the course of positioning, there is provided a path for oil leakage. Additionally, in the noted device, in order to develop an adequate seal it is necessary that the ring be compressed or clamped subsequent to positioning between washers to develop lateral expansion.

Although O-rings are conventionally effectively employed by seating the same within a ring or groove in one of the members to be sealed, the use of a pre-mounted O-ring in such retaining groove in accumulator devices of the type disclosed in the above referenced United States patent which use a continuous locking ring has heretofore been impossible since the outer diameter of the O-ring must, of necessity, be larger than the inner diameter of the segments, to provide a sealing engagement with the face of the oil port, thus precluding passage of the O-ring through the smaller diameter opening defined by the segments of the locking ring.

Thus, blow out resistant locking ring assemblies heretofore have required the use of an upwardly mounted gasket member, despite the drawbacks hereinabove itemized.

SUMMARY OF THE INVENTION

The present invention may be summarized as directed to an accumulator device having an improved locking ring and seal arrangement. In accordance with the invention, the plug assembly includes an enlarged flange portion at its upper end and a reduced diameter locking ring retainer groove immediately below the flange.

The locking ring in accordance with the invention is comprised of a plurality (two or more) arcuate segments which are bonded to an annular elastomeric ring. The ring is discontinuous, being cut along a radius coincident with the junction of end portions of two segments.

The provision of a discontinuous ring, as opposed to the continuous but foldable ring of the above referenced patent, enables the segments to be spread from their radial configuration to a distended configuration and then positioned about the plug below the retaining flange thereof. It is thereby possible to utilize on the plug a conventional O-ring, inset within an annular groove in the plug, a feature which was impossible with an assembly in accordance with U.S. Pat. No. 2,936,787 since the larger diameter O-ring could not, in such device, be passed downwardly and outwardly through the smaller interior diameter of the aperture defined by the segments.

Accordingly, it is an object of the present invention to provide an accumulator device embodying an improved safety plug retainer construction.

A further object of the invention is the provision of a device which incorporates a locking ring construction which is subject to be spread or radially deformed by virtue of a split in the resilient segment retaining portion thereof, thereby enabling a conventional O-ring to be mounted on the plug, the outer diameter of which O-ring is greater than the inner diameter of the segments.

A further object of the invention is the provision of an accumulator device of the type described having improved seal forming properties.

A further object of the invention is the provision of an accumulator device having a blow out proof plug assembly which may be readily mounted in the oil port of the accumulator without fear of damage to the seal forming components thereof.

To attain these objects and such further objects as may appear herein or be hereinafter pointed out, reference is made to the accompanying drawings, forming a part hereof, in which.

Figure 1:
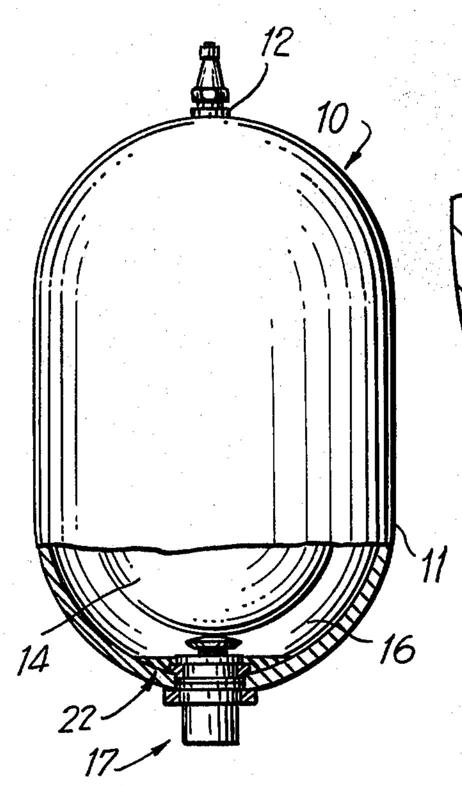
FIG. 1 is a side elevational view of an accumulator in accordance with the invention, partially in section.
Figure 2:
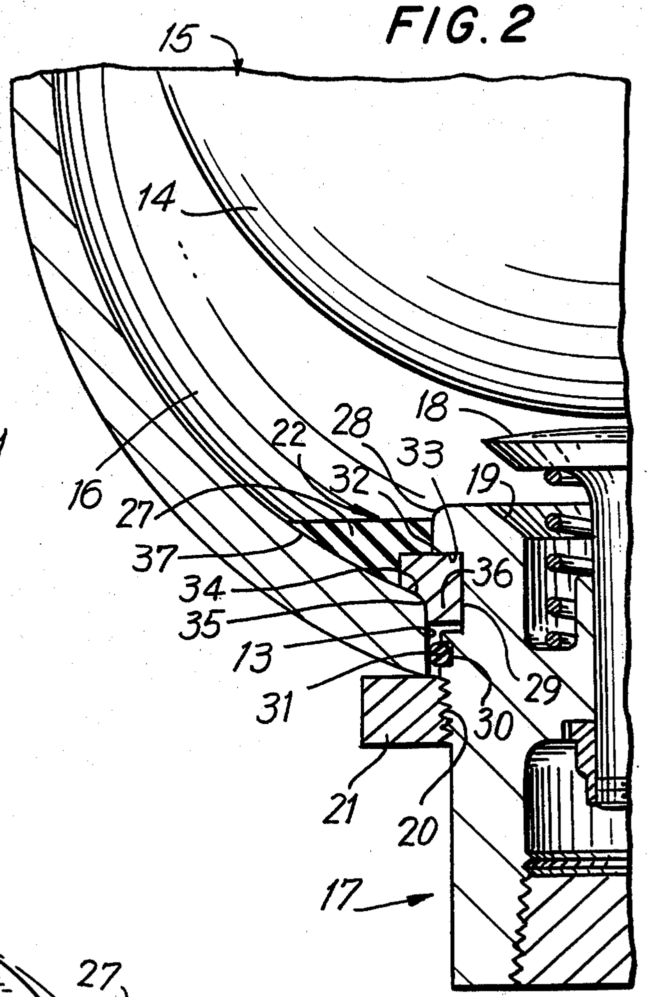
FIG. 2 is a magnified fragmentary sectional view of the oil port and plug assembly.

Turning now to the drawings, an accumulator 10 includes a pressure vessel 11 having a gas charging valve assembly 12 in one end thereof and an oil port 13 in the other end.

The pressure vessel has supported therein a distensible, elastomeric bladder 14 having an upper mouth portion (not shown) connected to the interior of the vessel surrounding the gas charging port in such manner as to divide the interior of the pressure vessel into two chambers, namely, a first chamber 15 in communication with the gas charging valve 12, and a second or oil chamber 16 in communication with the oil port 13.

A plug assembly 17 adapted to be mounted in the oil port 13 may include the usual valve member 18 axially shiftable within the assembly 17 and adapted to seat on the bevelled seat portion 19 to prevent extrusion of the bladder 14 through the oil port when pressure in the chamber 15 exceeds the pressure in the chamber 16.

The plug assembly 17 includes an external threaded portion 20 adapted to receive complemental, internally threaded clamp nut 21 which, in the manner hereinafter to be described, clampingly supports the plug assembly within the oil port 13.

It is the objective of the locking mechanism hereinafter to be described to maintain the plug assembly 17 within the oil port 13, even if the nut 21 has been removed, while pressure remains in the chamber 15. If such safety mechanism were not provided, it will be observed that the plug assembly 17 could be blown out through the oil port, with attendant likelihood of injury. The means by which the plug assembly is retained in position is the locking ring assembly 22.

The locking ring assembly 22 includes two or more arcuate metallic segments which together define an annulus. In the illustrated embodiment, there are two such segments 23, 24 (FIG. 3), each of which describes an arc of substantially 180°. The segments meet at junction portions 25, 26 and are bonded to an annular resilient elastomeric ring 27 which, in its unstressed condition, maintains the segments 23, 24 in the essentially annular or circular configuration shown. The ring 27 includes a radially extending split 27' extending entirely therethrough, the split being aligned with junction 26 of segments 23, 24.

Figure 3:
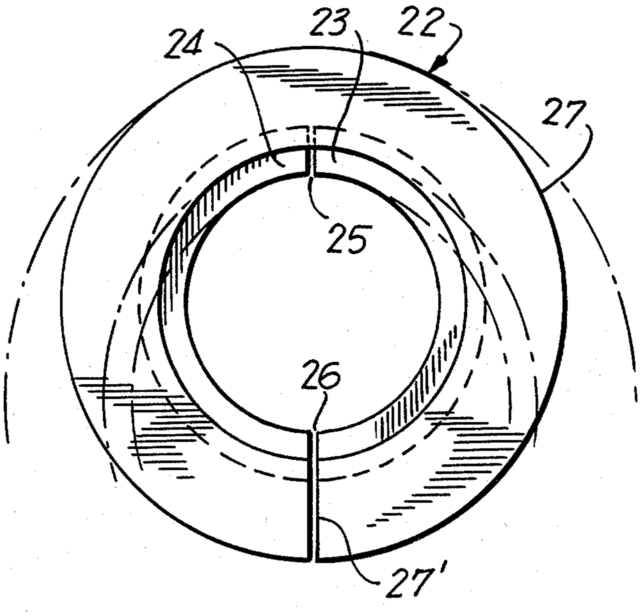
FIG. 3 is a plan view of a locking ring for use in the accumulator device.

It will be appreciated that by virute of the resilient elastomeric nature of the material forming the ring 27 and the slot 27', the segments 23, 24 may be spread by twisting or outwardly deforming the ring 27 (see dotted lines, FIG. 3).

The assembly 17 includes an upper headed flange portion 28, the outer diameter of which is slightly smaller than the inner diameter of the oil port 13. A locking ring retainer groove 29 is formed on the plug immediately beneath the flange 28. The plug includes, in addition, an O-ring retainer groove 30, which groove receives an O-ring member 31. The O-ring 31 is dimensioned to define a tight seal in the area between the oil port 13 and the O-ring retainer groove 30.

The assembly 17 is mounted within the oil port 13 by first sliding the assembly upwardly into the interior of the pressure vessel 11. With the plug member 17 disposed entirely within the pressure vessel, the locking ring assembly 22 is next inserted into the interior of the vessel as by folding the same transversely about a line defined by the junctions 25, 26 of the rigid metallic segments 23, 24, such folding being permitted by the elasticity of the retaining ring portion 27 and split 27'.

After the ring has been disposed within the interior of the vessel, the same is distorted or deformed in such manner as to permit it to be snapped or otherwise disposed within the locking ring retainer groove 29, such distortion being permitted by the split 27'.

It will be readily recognized that a variety of different distorted configurations may be imparted to the locking ring, which distortions may include spreading in the plane of the ring and also deflection of the segments relative to each other and out of the plane of the ring.

Desirably, and especially in large installations where the locking ring may be six or more inches in diameter and accordingly requires substantial force to spread, application of the ring within the groove 29 may encompass a combined spreading and twisting of the ring to a position whereat the ring is essentially partihelicoid. In this configuration, one half or slightly less than one half of one segment may be disposed within the groove, with the other segment at a position above the top of the flange.

To complete mounting, the plug assembly and ring assembly may be relatively rotated, whereby the ring assembly is mounted within the groove 29 by a sort of threading action, much as the bead of a tire is progressively mounted over the rim of an automobile wheel.

It will be observed that the segments include on their upper surface an exposed metal portion 32 which underlies the downwardly directed shoulder 33 of the flange 28 so as to provide a metal to metal contact between the plug assembly and the segments. The under surface 34 of the segments is configured to match the upwardly facing surface at the junction 35 where the walls of the pressure vessel meet the oil port 13, whereby there is defined a metal to metal contact between the surfaces 34 and 35.

The segments preferably include depending leg portions 36 extending downwardly into the oil port. The under surface 37 of the ring 27 is likewise contoured complementally, intimately to engage an annular area of the interior of the pressure vessel surrounding the oil port 13.

After the plug and locking ring have been positioned in the manner indicated, the locking nut 21 may be tightened into position against the external surface of the pressure vessel surrounding the oil port 13.

From the foregoing description it will be recognized that there is provided a hydraulic accumulator device wherein the locking plug assembly may be positioned with an O-ring previously mounted therein, eliminating the tedious and often damaging operation of forcing an O-ring into a restricted annular space after the plug assembly has been disposed within the oil port.

The improved accumulator device and simplified assembly procedure thereof are made possible by the provision of a locking ring assembly which is not transversely bendable but also spreadable and otherwise deformable by virture of the use of a split elastomeric retainer ring as opposed to a continuous but bendable retainer ring of the prior art.

It will be recognized that those skilled in the art may, in the light of the instant disclosure, devise and/or develop modifications of the illustrated and described embodiment, which modifications incorporate the advantages hereinabove set forth. Accordingly, the invention is to be broadly construed within the scope of the appended claims.

Having thus described the invention and illustrated its use, what is claimed as new and is desired to be secured by Letters Patent is:

1. An accumulator device comprising, in combination, a pressure vessel having a gas port at one end and an oil port at the other end, a gas charging valve positioned in said gas port, a deformable bladder member mounted within said vessel and dividing the same into two chambers, namely, a first chamber communicating with said gas port, and a second chamber communicating with said oil port, a cylindrical plug member adapted to be inserted through said oil port into said second chamber, said plug member including a radially outwardly directed flange formed at the upper end thereof, and a threaded portion in downwardly spaced relation to said flange, the outer diameter of said flange being smaller than the inner diameter of said oil port, an annular seal ring receiver groove formed on the external surface of said plug member in spaced relation to said flange between said flange and said threaded portion, a seal ring seated in said groove and projecting radially beyond said plug, the outer diameter of said ring corresponding essentially to and engaging against the inner surface of said oil port, a locking member interposed between the under surface of said flange and the upper inside surface of said vessel surrounding said oil port, said locking member including a plurality of rigid arcuate metallic segments defining a ring having an inner diameter less than the diameter of said port and an outer diameter greater than the diameter of said port, the adjacent ends of said segments being disposed in close juxtaposition to define a substantially continuous surface, and an annulus of resilient elastomeric material bonded to said segments, said annulus including a slot extending along one radius of the annulus and completely through that portion of the annulus intersected by the radius from inner diameter to outer diameter of said portion to render said annulus discontinuous at the loci of the slot, said slot being disposed in alignment with one given junction between any two adjacent said segments whereby said locking member may be deformed and inserted through said oil port into said vessel and may thereafter be spread and mounted over said plug between said flange and said sealing ring, and clamp nut means threadedly engaging said threaded portion of said plug and urged against the exterior surface of said vessel surrounding said oil port whereby said locking member is clamped between said flange and the interior surface of said vessel surrounding said port.

2. An accumulator in accordance with claim 1 and including an annular lock receiver groove formed on said plug immediately below said flange, said segments of said locking member being seated in said receiver groove.

* * * * *